US012670318B2

(12) United States Patent
Gupta et al.

(10) Patent No.: US 12,670,318 B2
(45) Date of Patent: Jun. 30, 2026

(54) AUTOMATED REQUEST PROCESSING USING ENSEMBLE MACHINE LEARNING FRAMEWORK

(71) Applicant: Dell Products L.P., Round Rock, TX (US)

(72) Inventors: Srishti Gupta, Rohini (IN); Saurabh Jha, Austin, TX (US); Sailendu Kumar Patra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 17/974,215

(22) Filed: Oct. 26, 2022

(65) Prior Publication Data

US 2024/0143915 A1 May 2, 2024

(51) Int. Cl.
| | |
|---|---|
| *G06F 40/20* | (2020.01) |
| *G06F 40/44* | (2020.01) |
| *G06Q 30/016* | (2023.01) |

(52) U.S. Cl.
CPC ............... *G06F 40/20* (2020.01); *G06F 40/44* (2020.01); *G06Q 30/016* (2013.01)

(58) Field of Classification Search
CPC .......... G06F 40/20; G06F 40/44; G06F 40/30; G06Q 30/016
See application file for complete search history.

(56) References Cited

U.S. PATENT DOCUMENTS

| | | | |
|---|---|---|---|
| 9,582,408 B1 * | 2/2017 | Jayaraman | .......... G06F 11/3684 |
| 10,360,631 B1 * | 7/2019 | Jezewski | ............ G06Q 30/0201 |
| 2006/0053154 A1 * | 3/2006 | Yano | ................ G06F 16/90324 |
| | | | 707/999.102 |

(Continued)

FOREIGN PATENT DOCUMENTS

CN        115146959 A  *  10/2022

OTHER PUBLICATIONS

Miels, Emily, "Ticket escalation: What it is and how to manage it", Zendesk Blog, available at: https://www.zendesk.com/blog/art-ticket-escalation-process/ (last accessed Oct. 26, 2022), published May 15, 2017, last updated Mar. 13, 2022.

*Primary Examiner* — Daniel C Washburn
*Assistant Examiner* — Penny L Caudle
(74) *Attorney, Agent, or Firm* — Ryan, Mason & Lewis, LLP

(57) ABSTRACT

Methods, apparatus, and processor-readable storage media for automated request processing using an ensemble machine learning framework are provided herein. An example computer-implemented method includes aggregating interaction data associated with a request; computing a weighted score for the request, wherein the weighted score comprises a first component that is based at least in part on a comparison of the aggregated interaction data to a set of keywords and a second component corresponding to a sentiment predicted by a first machine learning model for at least a portion of the aggregated interaction data; using a second machine learning model to determine whether the request is anomalous based at least in part on the weighted score; and in response to determining that the request is anomalous, initiating one or more automated actions for the request.

20 Claims, 7 Drawing Sheets

(56)         References Cited

U.S. PATENT DOCUMENTS

| | | | |
|---|---|---|---|
| 2017/0293597 A1* | 10/2017 | Wang ...................... | G06F 16/35 |
| 2020/0302017 A1* | 9/2020 | Madavarapu ........... | H04L 51/02 |
| 2021/0004706 A1* | 1/2021 | Riddle ................... | G06F 40/30 |
| 2021/0158366 A1* | 5/2021 | Arnold .................. | G06F 40/253 |
| 2022/0051479 A1* | 2/2022 | Agarwal .............. | G06N 3/0475 |

* cited by examiner

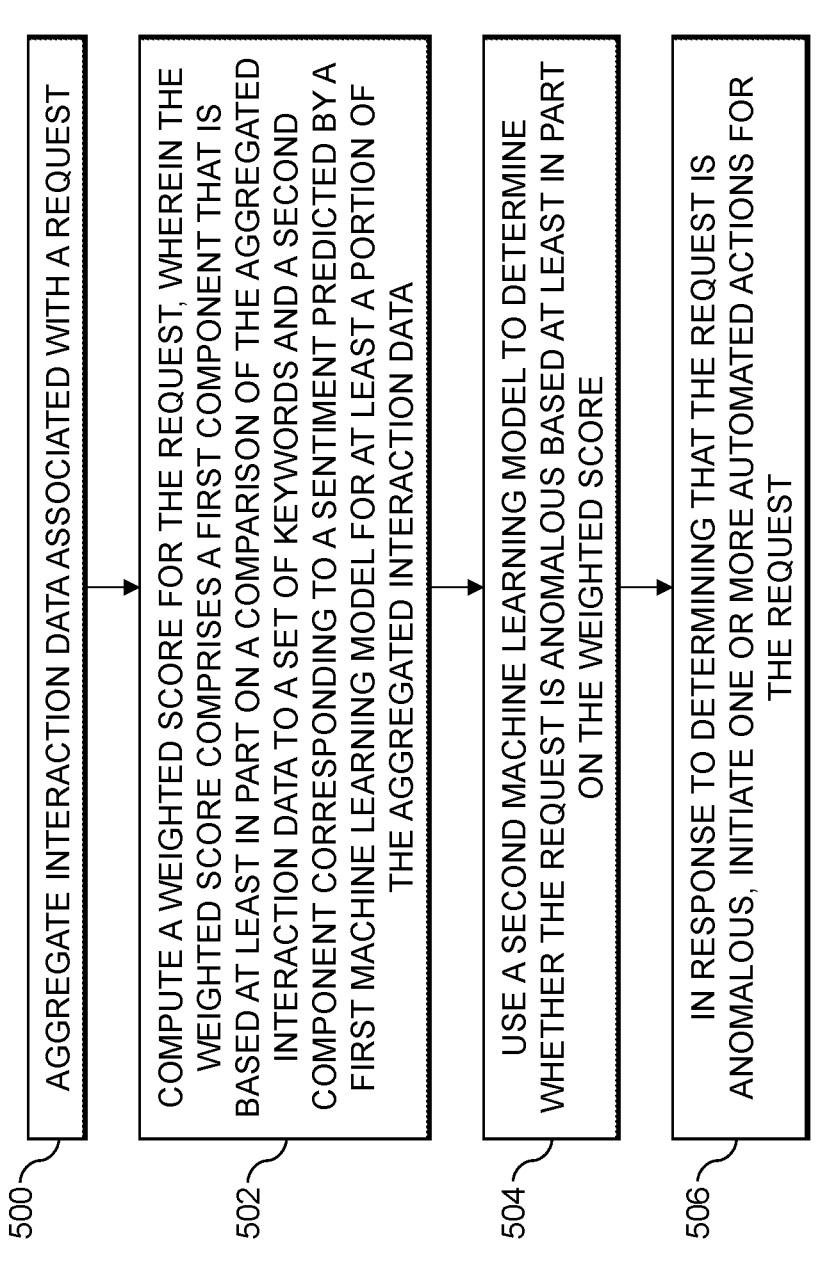

500 AGGREGATE INTERACTION DATA ASSOCIATED WITH A REQUEST

502 COMPUTE A WEIGHTED SCORE FOR THE REQUEST, WHEREIN THE WEIGHTED SCORE COMPRISES A FIRST COMPONENT THAT IS BASED AT LEAST IN PART ON A COMPARISON OF THE AGGREGATED INTERACTION DATA TO A SET OF KEYWORDS AND A SECOND COMPONENT CORRESPONDING TO A SENTIMENT PREDICTED BY A FIRST MACHINE LEARNING MODEL FOR AT LEAST A PORTION OF THE AGGREGATED INTERACTION DATA

504 USE A SECOND MACHINE LEARNING MODEL TO DETERMINE WHETHER THE REQUEST IS ANOMALOUS BASED AT LEAST IN PART ON THE WEIGHTED SCORE

506 IN RESPONSE TO DETERMINING THAT THE REQUEST IS ANOMALOUS, INITIATE ONE OR MORE AUTOMATED ACTIONS FOR THE REQUEST

FIG. 5

AUTOMATED REQUEST PROCESSING USING ENSEMBLE MACHINE LEARNING FRAMEWORK

FIELD

The field relates generally to information processing systems, and more particularly to processing requests in such systems.

BACKGROUND

Organizations are increasingly relying on automated support systems to manage user requests. Such systems typically include one or more agents (e.g., human and/or software agents) that attempt to resolve user requests. Requests that cannot be resolved by the agents are often escalated so that they can be handled by another agent or system, for example.

SUMMARY

Illustrative embodiments of the disclosure provide techniques for automated request processing using an ensemble machine learning framework. An exemplary computer-implemented method includes: aggregating interaction data associated with a request; computing a weighted score for the request, wherein the weighted score comprises a first component that is based at least in part on a comparison of the aggregated interaction data to a set of keywords and a second component corresponding to a sentiment predicted by a first machine learning model for at least a portion of the aggregated interaction data; using a second machine learning model to determine whether the request is anomalous based at least in part on the weighted score; and in response to determining that the request is anomalous, initiating one or more automated actions for the request.

Illustrative embodiments can provide significant advantages relative to conventional request processing techniques. For example, technical problems associated with escalating user requests in conventional approaches are mitigated in one or more embodiments by implementing an ensemble machine learning framework that can efficiently and accurately predict when to escalate a given request based on user interactions.

These and other illustrative embodiments described herein include, without limitation, methods, apparatus, systems, and computer program products comprising processor-readable storage media.

BRIEF DESCRIPTION OF THE DRAWINGS

FIG. 5 shows a flow diagram of a process for automated request processing using an ensemble machine learning framework in an illustrative embodiment.

DETAILED DESCRIPTION

Figure 1:
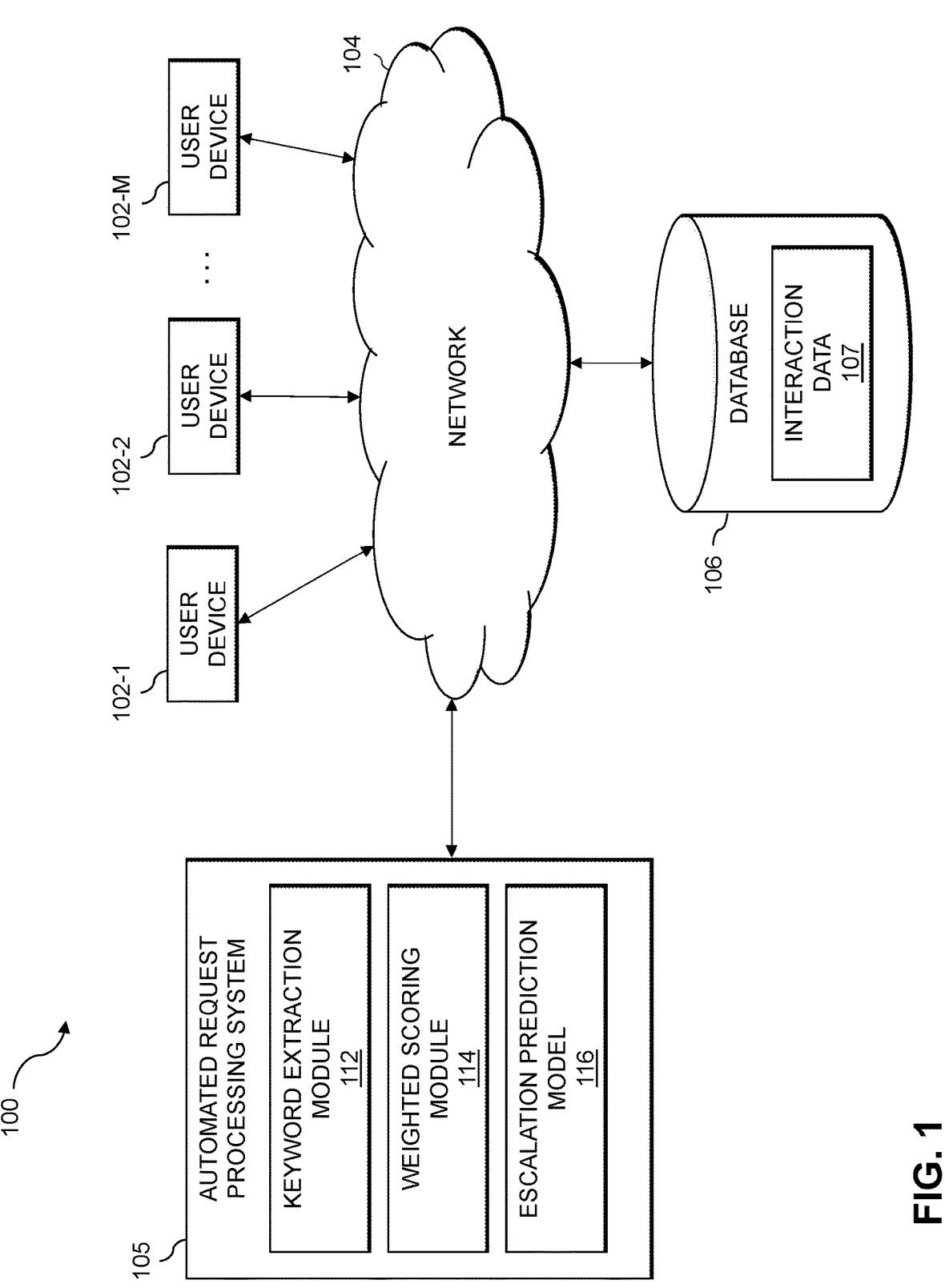
FIG. 1 shows an information processing system configured for automated request processing using an ensemble machine learning framework in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

User requests are often initially provided to generalized agents for resolution. If a given user request cannot be resolved, then it can be escalated to a specialized agent for further investigation and processing. Generalized agents are increasingly being implemented as software agents (e.g., chat bots), although at least some of the generalized agents for a given organization can also include human agents. There may be a limited number of specialized agents in a given organization, as they are often human agents that have additional experience and/or training to handle more complex requests. Accordingly, the efficiency of support systems is closely tied to the timely identification of user requests that need to be escalated. It is noted that the term "request" in this context and elsewhere herein is intended to be broadly construed so as to encompass, for example, a message, a query, or other types of communication that request information and/or performance of one or more actions. As an example, a given request can be associated with a product and/or a service, and the information and/or the one or more actions can be related to resolving an issue with the product and/or the service.

Conventional approaches for escalating requests generally rely on human agents and/or automated agents to escalate requests. For human agents, determining escalation risk for a given user request is often challenging as the determination can include tracking information related to a customer (e.g., prior interactions, usage data associated with products and/or services, etc.) as well as tracking the sentiment of the user. Tracking the sentiment of the user is particularly challenging for cases when the interactions occur via a textual format (e.g., due to the lack of facial expressions and voice modulations). Software agents are generally not effective at tracking user sentiment in these situations.

One or more embodiments described herein provide automated techniques for proactively identifying potential escalations of user requests based on customer interaction data. In some embodiments, a predictive model can be trained by extracting textual features, emotion-based features, and/or other features (e.g., tabular features) from historical interaction data to predict such escalations. The prediction can initiate one or more automated actions for resolving, remediating and/or otherwise addressing the user request, as explained in more detail elsewhere herein.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an automated request processing system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated request processing system 105 can have at least one associated database 106 configured to store data pertaining to, for example, interaction data 107 related to one or user requests.

An example database 106, such as depicted in the present embodiment, can be implemented using one or more storage systems associated with the automated request processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated request processing system 105 are one or more input-output devices, which illustratively comprise keyboards, displays or other types of input-output devices in any combination. Such input-output devices can be used, for example, to support one or more user interfaces to the automated request processing system 105, as well as to support communication between automated request processing system 105 and other related systems and devices not explicitly shown.

Additionally, the automated request processing system 105 in the FIG. 1 embodiment is assumed to be implemented using at least one processing device. Each such processing device generally comprises at least one processor and an associated memory, and implements one or more functional modules for controlling certain features of the automated request processing system 105.

More particularly, the automated request processing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated request processing system 105 to communicate over the network 104 with the user devices 102, and illustratively comprises one or more conventional transceivers.

The automated request processing system 105 further comprises a keyword extraction module 112, a weighted scoring module 114, and an escalation prediction model 116.

The keyword extraction module 112, in some embodiments, automatically identifies a set of keywords in data (e.g., interaction data 107) relevant for escalating requests. In some embodiments, the keywords are saved as a keyword dictionary (e.g., in database 106). The extraction of keywords can reduce the dimensionality of text into important features. Additional details of an example keyword extraction module 112 are discussed in conjunction with FIG. 2.

The weighted scoring module 114 generates features for constructing the escalation prediction model 116. In some embodiments, the weighted scoring module 114 generates three scores for interaction data corresponding to a given user request. As an example, the weighted scoring module 114 can generate a first score by analyzing the obtained interaction data based on the set of keywords identified by the keyword extraction module 112. A second score is generated using a machine learning sentiment model that is trained to generate an aggregated score based on individual scores extracted from the interaction data for a set of emotions. A third score is generated by aggregating data to create a chronological interaction summary for a specific user and for a specific request. The scores are then weighted and assigned to the obtained interaction data to create a training sample for training the escalation prediction model 116, as explained in more detail below in conjunction with FIG. 3, for example.

Figure 4:
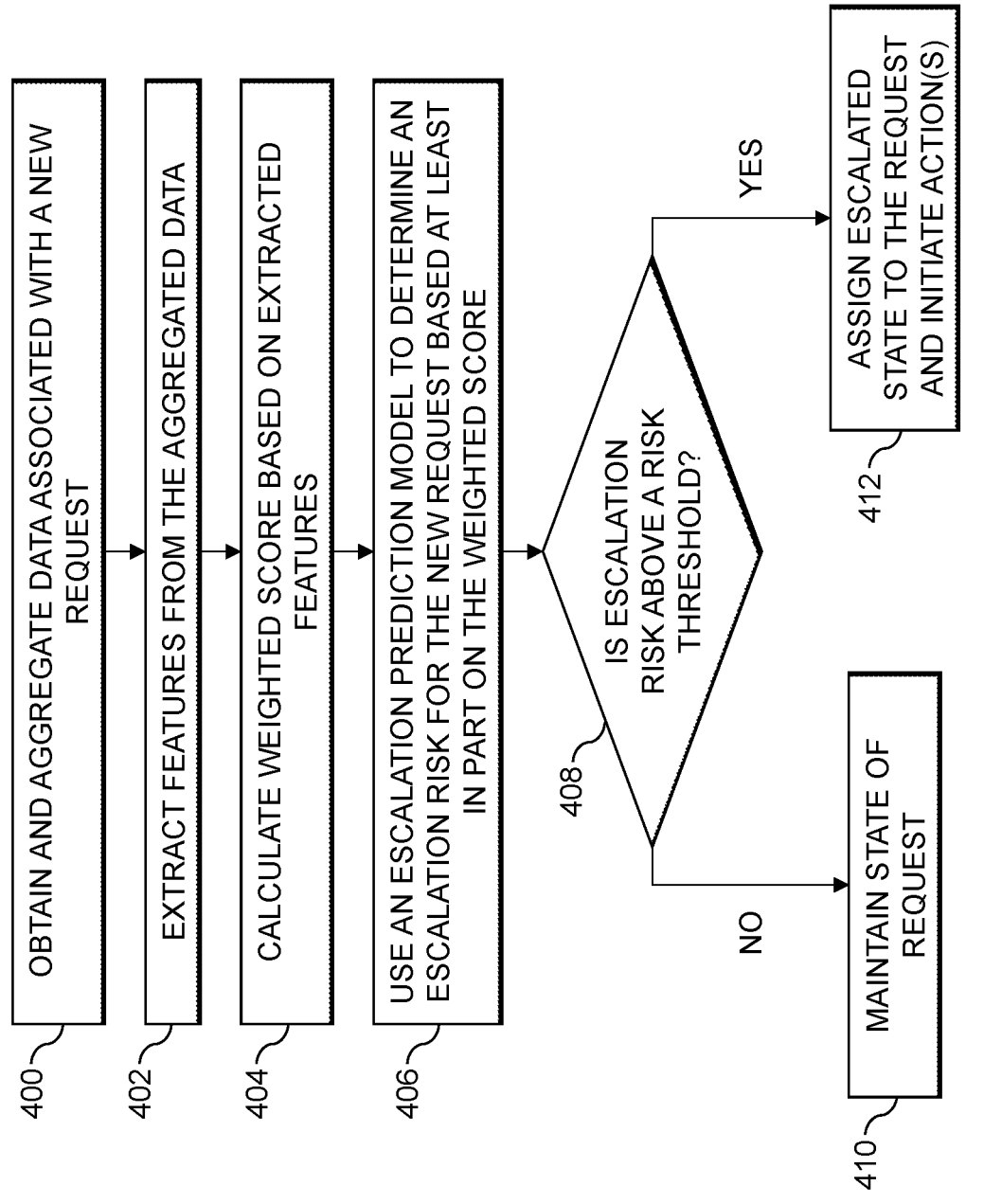
FIG. 4 shows a flow diagram for generating an escalation prediction in an illustrative embodiment.

The escalation prediction model 116, in some embodiments, can be implemented as a boosting machine learning algorithm (such as a Gradient Boosting algorithm) that is trained using the training samples generated by the weighted scoring module 114 to predict a likelihood that a given user request will be escalated, as explained in more detail in conjunction with FIG. 4, for example. In one embodiment, the escalation prediction model 116 can be iteratively trained using a supervised XGBoost algorithm based on at least a subset of the training samples. In such an embodiment, the escalation prediction model 116 can be iteratively trained (e.g., modified) until a macro average of training scores (e.g., corresponding to accuracy) satisfies a threshold value.

It is to be appreciated that this particular arrangement of elements 112, 114 and 116 illustrated in the automated request processing system 105 of the FIG. 1 embodiment is presented by way of example only, and alternative arrangements can be used in other embodiments. For example, the functionality associated with the elements 112, 114 and 116 in other embodiments can be combined into a single module, or separated across a larger number of modules. As another example, multiple distinct processors can be used to implement different ones of the elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automated request processing system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the automated request processing system 105 and database(s) 106 can be on and/or part of the same processing platform.

An exemplary process utilizing elements 112, 114 and 116 of an example automated request processing system 105 in computer network 100 will be described in more detail with reference to, for example, the flow diagram of FIG. 5.

Figure 2:
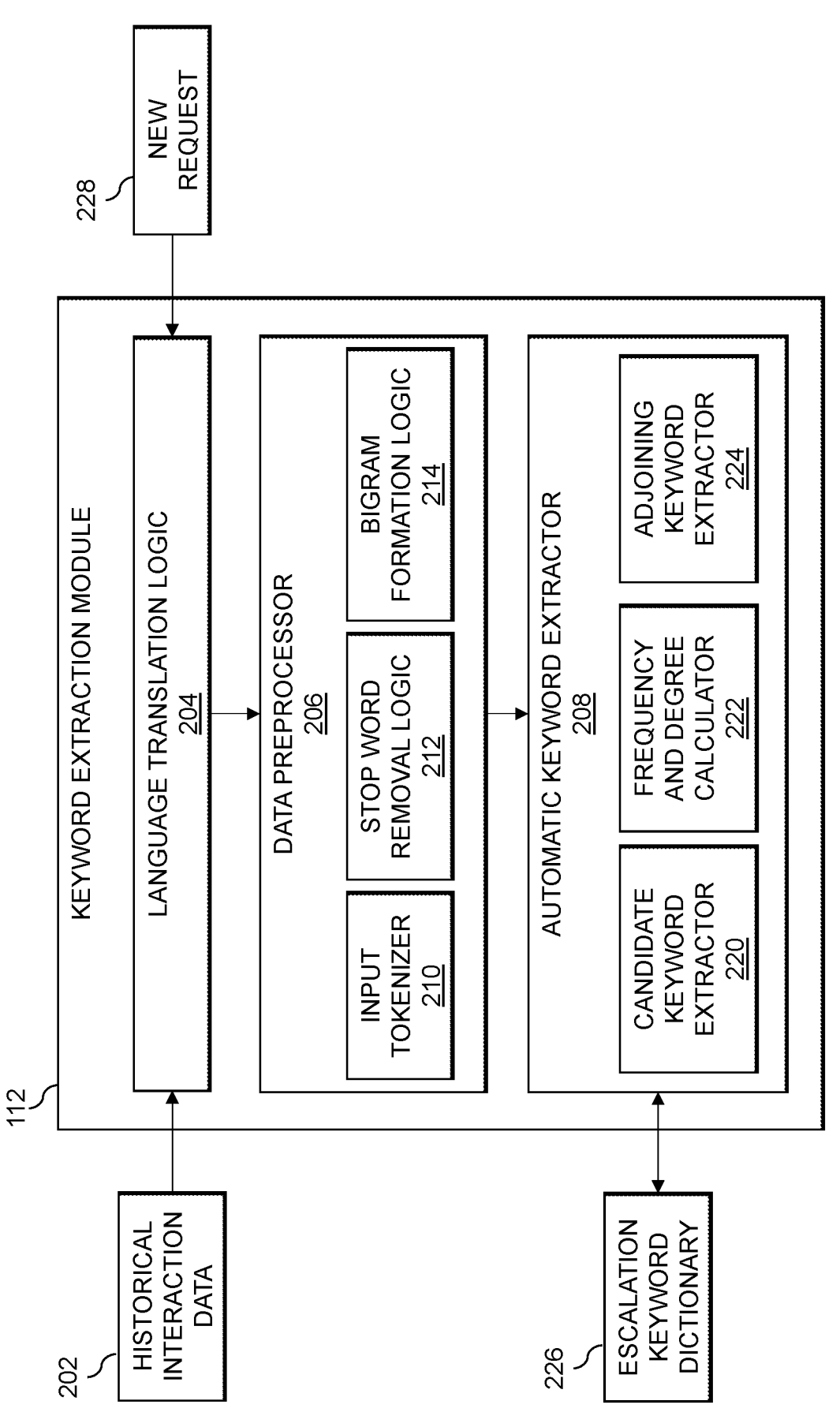
FIG. 2 shows an example of a keyword extraction module in an illustrative embodiment.

Referring now to FIG. 2, an example of a keyword extraction module 112 is shown in an illustrative embodiment. In the FIG. 2 example, the keyword extraction module 112 includes language translation logic 204, data preprocessor 206, and automatic keyword extractor 208. The language translation logic 204 obtains historical interaction data 202 for a plurality of users. The historical interaction data 202 can be stored in any suitable format, such as emails, messages, and/or voice recordings. The language translation logic 204 converts the historical interaction data 202 into a generic format (e.g., text) and, optionally, into a common language (e.g., English). By way of example, machine learning models can be used to convert the voice data into text and/or to convert the text into a common language. Wave2Vec2 is one example of a transformer-based model that is trained to generate text for waveforms provided as input in the form of float arrays. The text can be converted into a common language using a transformer-based language translation model, for example.

The resulting text dataset is provided to data preprocessor 206. In the FIG. 2 example, the data preprocessor 206 includes the following sub-modules: input tokenizer 210, stop word removal logic 212, and bigram formation logic 214. The input tokenizer 210 converts the entire text into unigrams or tokens, and the stop word removal logic 212 identifies and removes stop words from the text dataset (e.g., based on a list of stop words). A stop word generally refers to a word that provides less information than other words in the text dataset (e.g., articles, prepositions, pronouns, and/or conjunctions). The bigram formation logic 214 forms bigrams for the individual tokens.

The automatic keyword extractor 208, in some embodiments, determines the "important" keywords (e.g., some keywords that help predict whether a given user request should be escalated). More specifically, a candidate keyword extractor 220 extracts individual tokens (e.g., corresponding to keywords), and selects a specified number of the keywords based on a degree and co-occurring frequency of the individual tokens as calculated by a frequency and degree calculator 222 of the automatic keyword extractor 208. Additionally, an adjoining keyword extractor 224 determines keywords that are similar to the selected keywords (e.g., by computing a cosine similarity of the selected keywords). The list of individual keywords and similar keywords are intersected against a list of keywords manually curated as key tokens. Accordingly, the automatic keyword extractor 208 can augment the list of manually curated keywords with new keywords that co-occur with the former, to form an escalation keyword dictionary 226.

In some embodiments, the escalation keyword dictionary 226 can be dynamically updated in response to a new request 228 being flagged (e.g., labeled) as an escalated request. As an example, the escalation keyword dictionary 226 is dynamically updated by processing the new request 228 with the language translation logic 204, the data preprocessor 206, and the automatic keyword extractor 208, in a similar manner as described above. This enables, for example, the escalation keyword dictionary 226 to properly identify and weight issues that can potentially result in a request being escalated.

Figure 3:
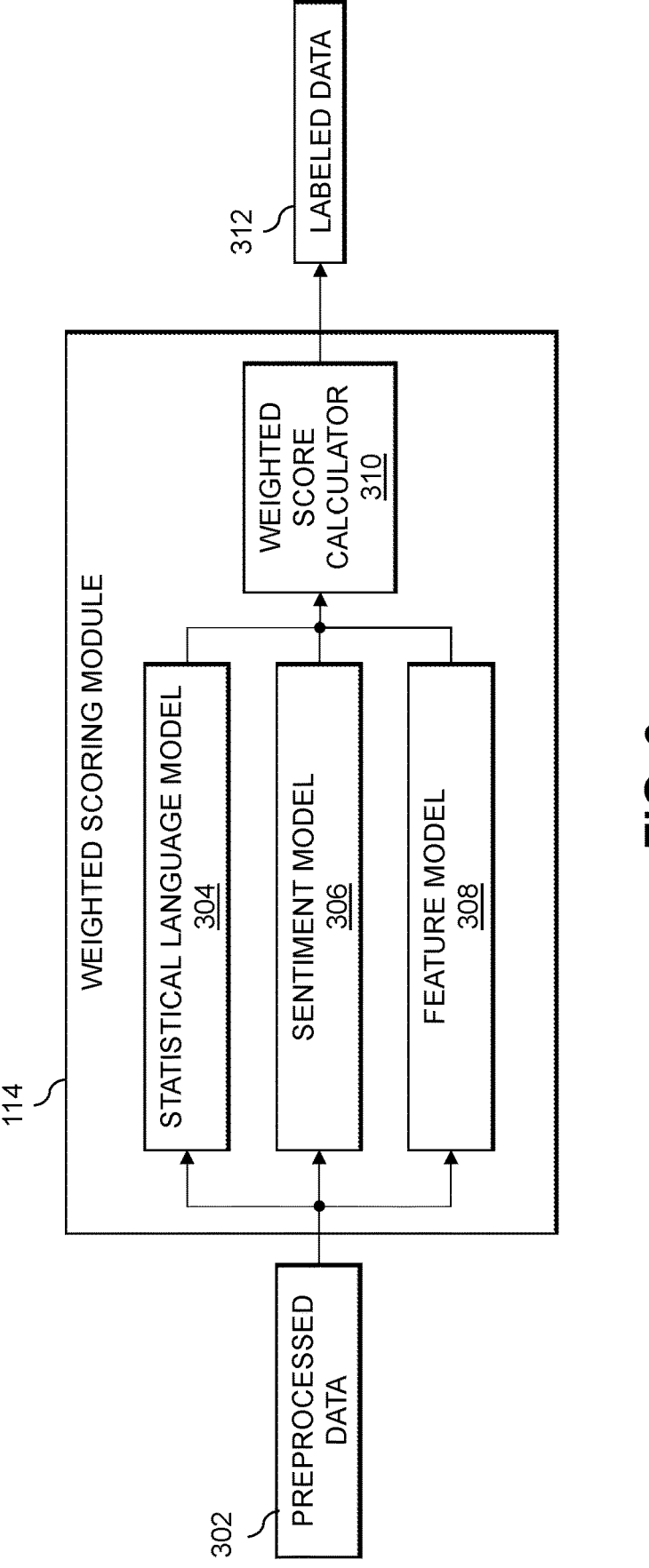
FIG. 3 shows an example of a weighted scoring module in an illustrative embodiment.

FIG. 3 shows an example of a weighted scoring module in an illustrative embodiment. In this example, the weighted scoring module 114 obtains preprocessed data 302. The preprocessed data 302 may include interaction data for a plurality of user requests, as well as other types of information corresponding to a given user request. The weighted scoring module 114 computes scores for the user requests based on a statistical language model 304, a sentiment model 306, and a feature model 308.

The statistical language model 304 includes a bag of words model in some embodiments that analyzes the preprocessed data 302 to identify keywords that are present in the escalation keyword dictionary 226. Generally, text (e.g., in a document or file) is represented as a multiset of its words, possibly disregarding grammar, and can be used to extract features (e.g., degree and co-occurring frequency of words) from the text, as described in more detail elsewhere herein. If a keyword is present, then a feature value for that keyword can be assigned a first value (e.g., 1), otherwise the feature value is assigned a second value (e.g., 0). The statistical language model 304 also can apply a sliding window approach when a lookup keyword from the escalation keyword dictionary is a bigram. The sliding window approach can be configured with a number of filler words for purposes of flagging the presence of the bigram in the text. As an example, assume a bigram is "abc1 abc2" and the text being analyzed includes, "xyz1, xyz2, abc1, xyz2, xyz3, abc2." If the number of filler words is specified as two or more, then the statistical language model 304 can determine that the bigram is present as there are two filler words (i.e., xyz2, xyz3) between abc1 and abc2. For a given user request, the statistical language model 304 assigns a binary value to keywords or features (referred to as bag of words features) that are present in the preprocessed data 302. These values are used to generate a first score for the user request, for example. In some embodiments, the first score can be calculated by generating an array, where each entry corresponds to a keyword. An entry is assigned a value of 1, (for example) if the keyword is present, otherwise the entry is assigned a value of 0. In such an example, the first score can be equal to the sum of the entries.

The weighted scoring module 114 also comprises a sentiment model 306 that is applied to the preprocessed data 302 to generate a second score. The sentiment model 306, in at least some embodiments, can correspond to a six-point emotion model that determines probabilities for respective emotions (e.g., anger, joy, surprise, fear, love, and/or sadness) associated with different portions of text of the preprocessed data 302. The sentiment model 306 can aggregate one or more of the probabilities determined for the preprocessed data 302 for a given user request to determine an overall sentiment (e.g., positive sentiment or negative sentiment). By way of example, the probabilities corresponding to fear, sadness, and anger can be aggregated to determine whether the preprocessed data 302 satisfies a threshold value. If so, a negative sentiment flag can be assigned to the user request corresponding to the preprocessed data 302.

The sentiment model 306, in at least some embodiments, can be built using a deep learning framework, where tokenized input text is converted to sentence embeddings. The sentence embeddings are provided to an encoder-decoder model that outputs emotions as a set of probability scores. As an example, the deep learning framework may be a DistilBERT model, which uses a distillation technique to approximate a Bidirectional Encoder Representations from Transformers (BERT) model. A DistilBERT model generally refers to a pre-trained general-purpose language representation model that can be fine-tuned to perform a particular task. Thus, in one or more embodiments, a DistilBERT model can be fine-tuned to classify different emotions in text by adding a new set of output layers and training the DistilBERT model in a supervised manner.

In the FIG. 3 example, the weighted scoring module 114 also includes a feature model 308. The feature model 308 generates a third score for the preprocessed data 302 by aggregating the preprocessed data 302 at a user (e.g., customer) and a request (e.g., case) level to extract features (e.g., tabular features) that are specific to the given user and the given request. For example, the features can relate to the other types of information in the preprocessed data 302 (e.g., changes in delivery time, part shortages, increases in manufacturing lead time, supply chain disruption, a number of days the user request has been unresolved, a number of case owners and/or any intervention actions associated with the request). These features can be used to generate the third score.

A weighted score calculator 310 obtains the scores generated by the models 304, 306, and 308, and computes a weighted score (e.g., a weighted sum) for respective user requests in the preprocessed data 302. In at least one such embodiment, the weights applied to each score can be manually specified. The weighted scoring module 114 outputs labeled data 312, which can be used to train the escalation prediction model 116 (not shown in FIG. 3).

FIG. 4 shows a flow diagram for generating an escalation risk prediction in an illustrative embodiment. In this example, it is assumed that the escalation prediction model 116 has been trained based at least in part on the labeled data 312.

Step 400 includes obtaining and aggregating data associated with a new request (e.g., a customer support request). The aggregated data may include, for example, any interactions (e.g., voice, email, chats) associated with a user of the new request over a particular period of time. The aggregated data, in some embodiments, can also capture a set of characteristics comprising one or more of: changes in delivery time, part shortages, increases in manufacturing lead time, supply chain disruption, case age (e.g., the number of days the case hasn't been resolved), number of case owners and/or any interventions (e.g., by specialized agents).

Step 402 includes extracting features from the aggregated data (e.g., as described in conjunction with FIG. 2), and step 404 includes calculating a weighted score based on the extracted features (e.g., as described in conjunction with FIG. 3).

Step 406 includes using an escalation prediction model (such as the escalation prediction model 116) to determine an escalation risk for the new request based at least in part on the weighted score.

Step 408 includes performing a test to determine if the escalation risk is above a risk threshold. If no, then step 410 is performed, which includes maintaining a state of the request.

Otherwise, step 412 is performed, which includes assigning an escalated state to the request and initiating one or more actions. The one or more actions can include, for example, sending one or more alerts to an agent handling the request and/or performing one or more actions to remediate or otherwise address the request. As non-limiting examples, if the request is related to a product that has not been delivered, then the action can include automatically re-shipping the product, and/or automatically refunding at least a portion of the product.

FIG. 5 is a flow diagram of a process for automated request processing using an ensemble machine learning framework in an illustrative embodiment. It is to be understood that this particular process is only an example, and additional or alternative processes can be carried out in other embodiments.

In this embodiment, the process includes steps 500 through 506. These steps are assumed to be performed by the automated request processing system 105 utilizing its elements 112, 114 and 116.

Step 500 includes aggregating interaction data associated with a request. Step 502 includes computing a weighted score for the request, wherein the weighted score comprises a first component that is based at least in part on a comparison of the aggregated interaction data to a set of keywords and a second component corresponding to a sentiment predicted by a first machine learning model for at least a portion of the aggregated interaction data. Step 504 includes using a second machine learning model to determine whether the request is anomalous based at least in part on the weighted score. Step 506 includes, in response to determining that the request is anomalous, initiating one or more automated actions for the request.

The process may further include a step of obtaining order information for one or more of a service and a product associated with the request, wherein the computing the weighted score further comprises a third component based on one or more features extracted from the order information. The first machine learning model may include a transformer-based machine learning model that generates scores for a plurality of emotions. The second machine learning model may include a boosting machine learning process. The aggregated interaction data may include at least one of text data and voice data. The set of keywords may be generated based at least in part on co-occurrence frequencies of words identified in historical aggregated interaction data for a plurality of historical requests. The process may further include a step of updating the set of keywords based at least in part on the aggregated interaction data associated with the request. The one or more automated actions may include at least one of: generating one or more notifications related to the anomalous request; escalating the anomalous request for handling by one or more support agents; and automatically adjusting an order associated with the request. The request may be from a user and may be associated with one or more of a service and a product.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve request processing. These and other embodiments can effectively overcome problems associated with existing testing techniques that require agents to manually review data to determine escalation risk, which increases the time and computing resources that are needed for processing the request. For example, some embodiments are configured to train and dynamically update a machine learning framework that can preemptively predict when to escalate a given request based on user interactions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
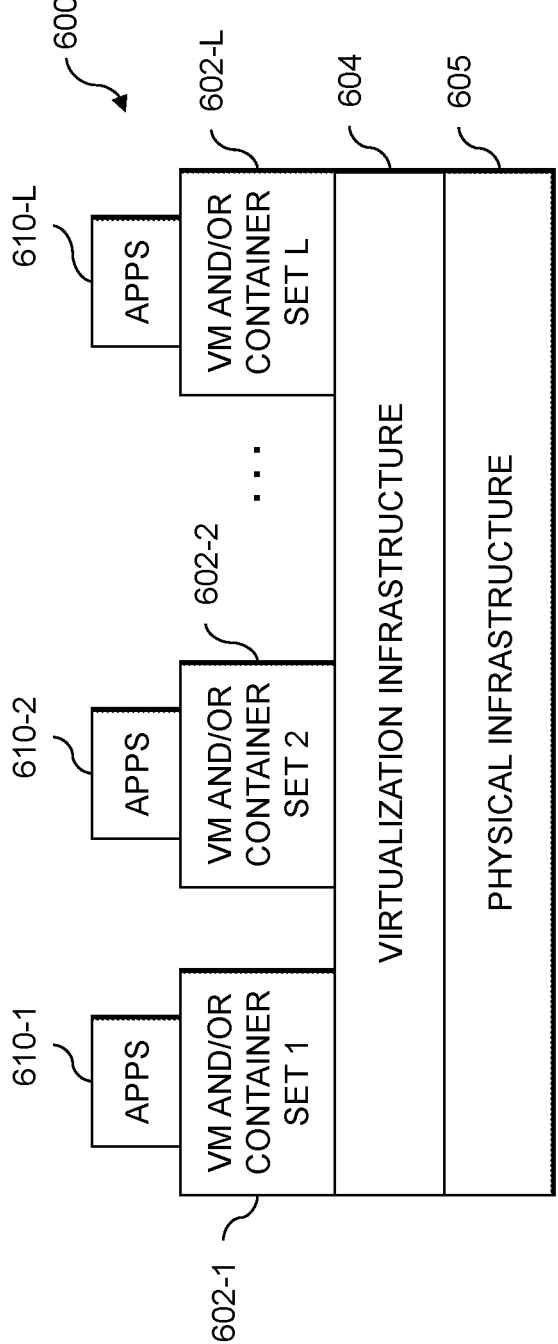
FIGS. 6 and 7 show examples of processing platforms that may be utilized to implement at least a portion of an information processing system in illustrative embodiments.
Figure 7:
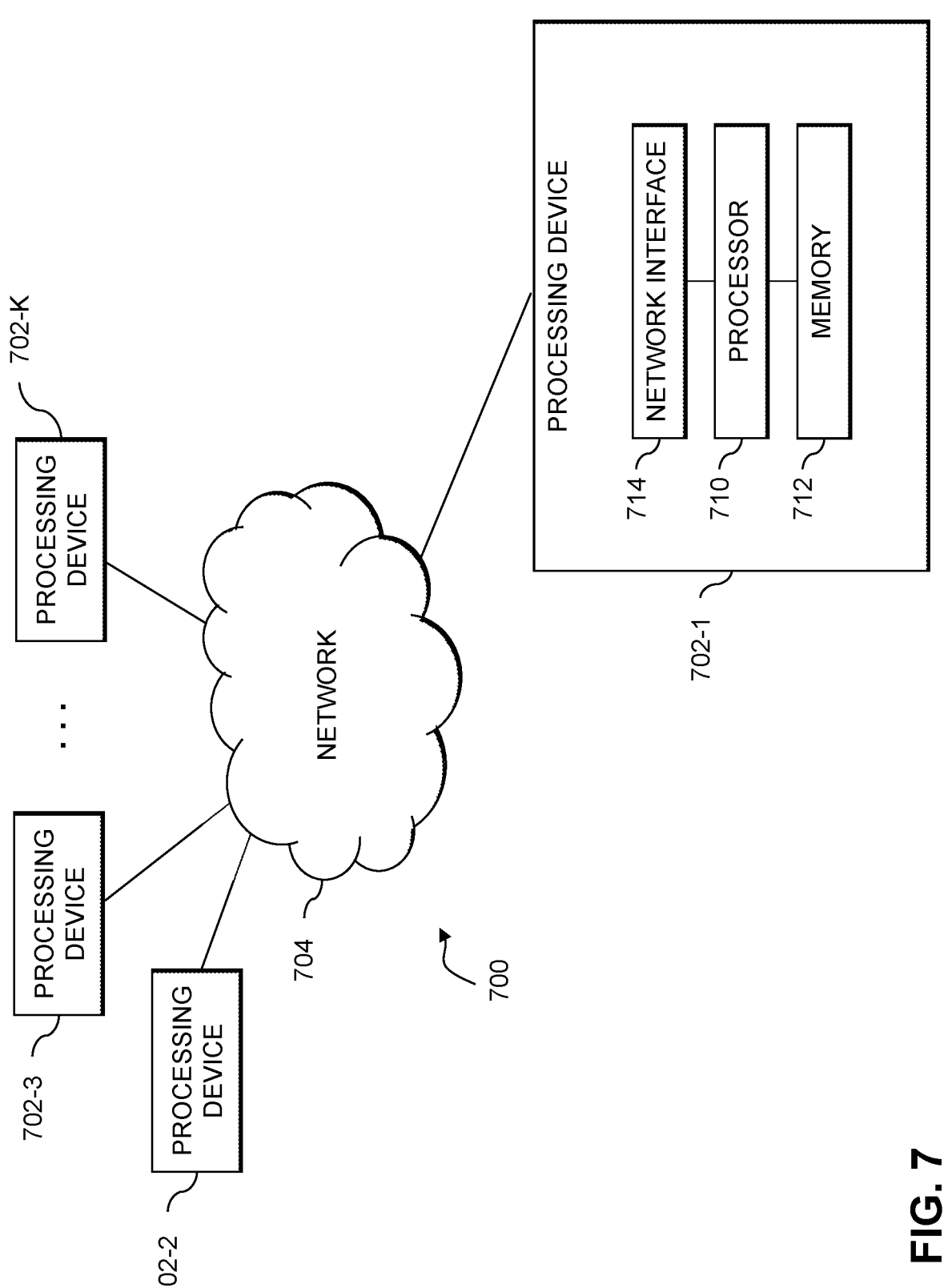

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

aggregating interaction data associated with a request;

generating, by a first machine learning model, predicted user sentiment related to the request based at least in part on a portion of the aggregated interaction data;

generating a first score for the request based at least in part on a comparison of the aggregated interaction data to a set of keywords, wherein the set of keywords is generated by intersecting words identified based at least in part on co-occurrence frequencies of words within historical aggregated interaction data corresponding to a plurality of historical requests with a manually curated list of keywords;

computing a second score for the request, wherein the second score is based on a weighted combination of at least the first score and the predicted user sentiment output from the first machine learning model;

determining, by a second machine learning model, whether the request is anomalous, wherein the second machine learning model obtains the second score as an input and determines whether the request is anomalous based at least in part on the second score; and in response to determining that the request is anomalous:

(i) initiating one or more automated actions for the request; and (ii) dynamically updating the set of keywords by extracting one or more new keywords from the aggregated interaction data of the anomalous request, wherein the one or more new keywords are identified based at least in part on co-occurrence frequencies of words within the aggregated interaction data of the anomalous request; and determining whether an additional request is anomalous based at least in part on the updated set of keywords;

wherein the method is performed by at least one processing device comprising a processor coupled to a memory.

2. The computer-implemented method of claim 1, comprising:

obtaining order information for one or more of a service and a product associated with the request, wherein the computing the second score is further based on one or more features extracted from the order information, and wherein the one or more features comprise a change in delivery time, a part shortage, an increase in manufacturing lead time, and/or a supply chain disruption.

3. The computer-implemented method of claim 1, wherein the first machine learning model comprises a transformer-based machine learning model that generates scores for a plurality of emotions, and wherein the predicted user sentiment is determined by aggregating the scores for a designated subset of the plurality of emotions.

4. The computer-implemented method of claim 1, wherein the second machine learning model comprises a boosting machine learning process.

5. The computer-implemented method of claim 1, wherein the aggregated interaction data comprises at least one of: text data and voice data.

6. The computer-implemented method of claim 1, wherein the one or more automated actions comprises at least one of:

generating one or more notifications related to the anomalous request;

escalating the anomalous request for handling by one or more support agents; and automatically adjusting an order associated with the request.

7. The computer-implemented method of claim 1, wherein the request is from a user and associated with one or more of a service and a product.

8. A non-transitory processor-readable storage medium having stored therein program code of one or more software programs, wherein the program code when executed by at least one processing device causes the at least one processing device:

to aggregate interaction data associated with a request;

to generate, by a first machine learning model, predicted user sentiment related to the request based at least in part on a portion of the aggregated interaction data;

to generate a first score for the request based at least in part on a comparison of the aggregated interaction data to a set of keywords, wherein the set of keywords is generated by intersecting words identified based at least in part on co-occurrence frequencies of words within historical aggregated interaction data corresponding to a plurality of historical requests with a manually curated list of keywords;

to compute a second score for the request, wherein the second score is based on a weighted combination of at least the first score and the predicted user sentiment output from the first machine learning model;

least the first score and the predicted user sentiment output from the first machine learning model;

to determine, by a second machine learning model, whether the request is anomalous, wherein the second machine learning model obtains the second score as an input and determines whether the request is anomalous based at least in part on the second score;

in response to determining that the request is anomalous:

(i) to initiate one or more automated actions for the request; and (ii) to dynamically update the set of keywords by extracting one or more new keywords from the aggregated interaction data of the anomalous request, wherein the one or more new keywords are identified based at least in part on co-occurrence frequencies of words within the aggregated interaction data of the anomalous request; and to determine whether an additional request is anomalous based at least in part on the updated set of keywords.

9. The non-transitory processor-readable storage medium of claim 8, wherein the program code when executed by the at least one processing device causes the at least one processing device:

to obtain order information for one or more of a service and a product associated with the request, wherein the computing the second score is further based on one or more features extracted from the order information, and wherein the one or more features comprise a change in delivery time, a part shortage, an increase in manufacturing lead time, and/or a supply chain disruption.

10. The non-transitory processor-readable storage medium of claim 8, wherein the first machine learning model comprises a transformer-based machine learning model that generates scores for a plurality of emotions, and wherein the predicted user sentiment is determined by aggregating the scores for a designated subset of the plurality of emotions.

11. The non-transitory processor-readable storage medium of claim 8, wherein the second machine learning model comprises a boosting machine learning process.

12. The non-transitory processor-readable storage medium of claim 8, wherein the aggregated interaction data comprises at least one of: text data and voice data.

13. The non-transitory processor-readable storage medium of claim 8, wherein the request is from a user and associated with one or more of a service and a product.

14. An apparatus comprising:

at least one processing device comprising a processor coupled to a memory;

the at least one processing device being configured:

to aggregate interaction data associated with a request;

to generate, by a first machine learning model, predicted user sentiment related to the request based at least in part on a portion of the aggregated interaction data;

to generate a first score for the request based at least in part on a comparison of the aggregated interaction data to a set of keywords, wherein the set of keywords is generated by intersecting words identified based at least in part on co-occurrence frequencies of words within historical aggregated interaction data corresponding to a plurality of historical requests with a manually curated list of keywords;

to compute a second score for the request, wherein the second score is based on a weighted combination of at least the first score and the predicted user sentiment output from the first machine learning model;

to determine, by a second machine learning model, whether the request is anomalous, wherein the second machine learning model obtains the second score as an input and determines whether the request is anomalous based at least in part on the second score;

in response to determining that the request is anomalous:

(i) to initiate one or more automated actions for the request; and (ii) to dynamically update the set of keywords by extracting one or more new keywords from the aggregated interaction data of the anomalous request, wherein the one or more new keywords are identified based at least in part on co-occurrence frequencies of words within the aggregated interaction data of the anomalous request; and to determine whether an additional request is anomalous based at least in part on the updated set of keywords.

15. The apparatus of claim 14, wherein the at least one processing device is further configured:

to obtain order information for one or more of a service and a product associated with the request, wherein the computing the second score is further based on one or more features extracted from the order information, and wherein the one or more features comprise a change in delivery time, a part shortage, an increase in manufacturing lead time, and/or a supply chain disruption.

16. The apparatus of claim 14, wherein the first machine learning model comprises a transformer-based machine learning model that generates scores for a plurality of emotions, and wherein the predicted user sentiment is determined by aggregating the scores for a designated subset of the plurality of emotions.

17. The apparatus of claim 14, wherein the second machine learning model comprises a boosting machine learning process.

18. The apparatus of claim 14, wherein the aggregated interaction data comprises at least one of: text data and voice data.

19. The apparatus of claim 14, wherein the one or more automated actions comprises at least one of:

generating one or more notifications related to the anomalous request;

escalating the anomalous request for handling by one or more support agents; and automatically adjusting an order associated with the request.

20. The apparatus of claim 14, wherein the request is from a user and associated with one or more of a service and a product.

* * * * *